(12) United States Patent
Neuhaus et al.

(10) Patent No.: US 9,212,694 B2
(45) Date of Patent: Dec. 15, 2015

(54) LINEAR GUIDE

(75) Inventors: Christoph Neuhaus, Niederelbert (DE); Thomas Quirein, Diez (DE)

(73) Assignee: Accuride International GmbH, Diez (DE)

( * ) Notice: Subject to any disclaimer, the term of this patent is extended or adjusted under 35 U.S.C. 154(b) by 0 days.

(21) Appl. No.: 14/009,667

(22) PCT Filed: Mar. 30, 2012

(86) PCT No.: PCT/EP2012/055832
§ 371 (c)(1),
(2), (4) Date: Nov. 4, 2013

(87) PCT Pub. No.: WO2012/136594
PCT Pub. Date: Oct. 11, 2012

(65) Prior Publication Data
US 2014/0318422 A1    Oct. 30, 2014

(30) Foreign Application Priority Data

Apr. 4, 2011 (DE) .......................... 10 2011 006 745

(51) Int. Cl.
*A47B 37/00* (2006.01)
*F16C 29/00* (2006.01)
*B60N 2/24* (2006.01)
(Continued)

(52) U.S. Cl.
CPC .............. *F16C 29/007* (2013.01); *B60N 2/242* (2013.01); *B60N 3/004* (2013.01); *B64D 11/06* (2013.01); *B64D 11/0638* (2014.12); *F16C 33/32* (2013.01); *F16M 11/043* (2013.01)

(58) Field of Classification Search
CPC .. A47B 2220/025; A47B 88/10; A47B 88/14; A47B 2210/0032; A47B 2210/0056; A47B 88/47; A47B 88/0466; F16C 29/04; B60N 3/002; B60N 3/004; B64D 2011/0679; A47C 7/68
USPC ........... 312/334.1, 334.7–334.9, 334.11, 350, 312/330.1, 334.27, 334.29, 334.31–334.34, 312/334.38, 333, 334.44; 108/143, 44, 48; 297/163, 146, 173, 188.05, 188.06, 297/188.21, DIG. 6; 296/37.9; 384/21, 18
See application file for complete search history.

(56) References Cited

U.S. PATENT DOCUMENTS 2,267,043 A * 12/1941 Premo .............................. 384/18
2,771,331 A * 11/1956 Messman ......................... 108/45
(Continued)

FOREIGN PATENT DOCUMENTS

DE      2 225 605 A    6/1973
DE     76 30 094 U    4/1977
(Continued)

*Primary Examiner* — Janet M Wilkens
(74) *Attorney, Agent, or Firm* — Paul & Paul

(57) ABSTRACT

A linear guide (1) having at least two rail elements (2, 2') which are movable counter to each other in the longitudinal direction, wherein each rail element (2, 2') has running surfaces (3, 3') which, together with running surfaces (3, 3') of a rail element (2, 2') moveable counter thereto, form tracks (4) for receiving rolling bodies (10) and sliding bodies (11) between the two rail elements which are moveable counter to each other, characterized in that at least one sliding body (11) and at least two rolling bodies (10) are provided in each track (4) between two rail elements (2, 2'), wherein at least one rolling body (10) is arranged in each case on both sides of a sliding body (11) in the longitudinal direction of the track (4).

18 Claims, 5 Drawing Sheets

(51) Int. Cl.
*B60N 3/00* (2006.01)
*B64D 11/06* (2006.01)
*F16M 11/04* (2006.01)
*F16C 33/32* (2006.01)

(56) References Cited

U.S. PATENT DOCUMENTS

| | | | | |
|---|---|---|---|---|
| 3,186,772 | A * | 6/1965 | Cohn | 384/18 |
| 3,759,587 | A | 9/1973 | Christin | |
| 3,926,397 | A | 12/1975 | Hunwicks | |
| 4,611,861 | A * | 9/1986 | Haruyama | 384/49 |
| 4,699,521 | A * | 10/1987 | Yokota | 384/18 |
| 5,322,735 | A * | 6/1994 | Fridez et al. | 428/357 |
| 5,626,405 | A * | 5/1997 | Banks | 312/334.8 |
| 5,671,988 | A * | 9/1997 | O'Neill | 312/334.44 |
| 6,155,661 | A * | 12/2000 | O'Neil et al. | 312/334.44 |
| 6,379,045 | B1 * | 4/2002 | Cirocco | 384/18 |
| 7,025,430 | B2 * | 4/2006 | Lauchner | 312/334.44 |
| 7,370,920 | B2 * | 5/2008 | Wang et al. | 312/334.11 |
| 7,621,593 | B2 * | 11/2009 | Dickinson | 297/163 |
| 8,690,270 | B2 * | 4/2014 | Hammerle et al. | 312/334.13 |
| 2003/0094843 | A1 * | 5/2003 | Jensen et al. | 297/391 |

FOREIGN PATENT DOCUMENTS

| | | |
|---|---|---|
| DE | 76 37 763 U | 6/1977 |
| DE | 28 43 935 | 4/1980 |
| DE | 31 01 435 A1 | 3/1981 |
| DE | 103 24 142 A1 | 12/2004 |
| DE | 10 2004 050 706 A1 | 4/2006 |
| EP | 2 301 383 A1 | 3/2011 |
| GB | 1 109 713 A | 4/1968 |
| WO | 03 099076 A1 | 12/2003 |

* cited by examiner

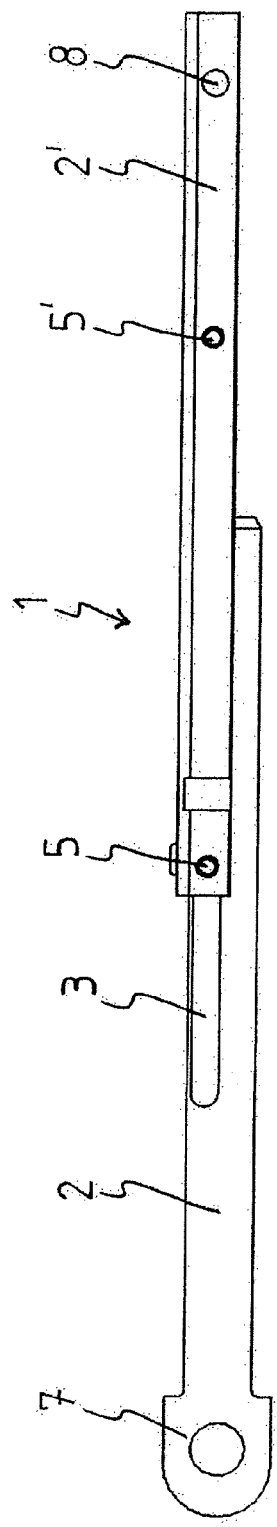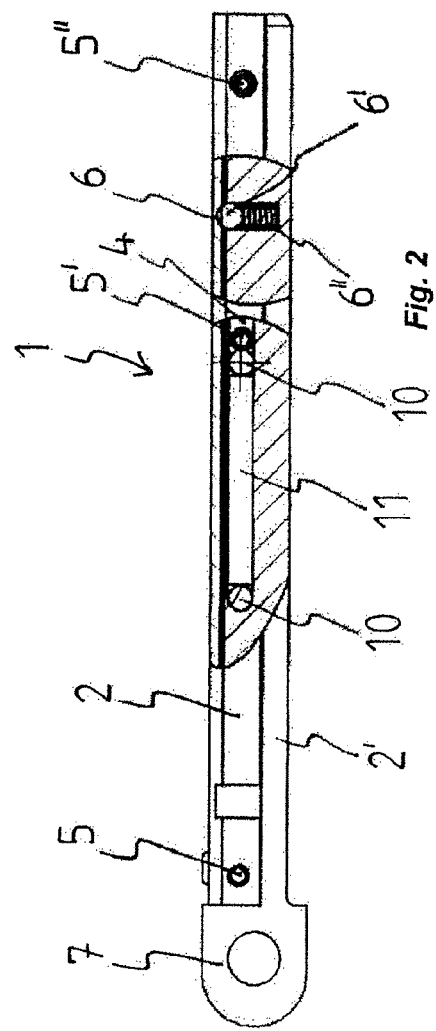
Fig. 1
Fig. 2

LINEAR GUIDE

SUBJECT-MATTER OF THE INVENTION

The invention concerns a linear guide having at least two rail elements which are displaceable relative to each other in the longitudinal direction, wherein each rail element has running surfaces which with running surface of a rail element moveable relative thereto form running tracks for receiving rolling bodies and sliding bodies between the respective two relatively displaceable rail elements.

In addition the invention concerns a pull-out table, preferably for fixing to the backrest of a seat in a transport means like a train, bus or aircraft seat, comprising a table top and two linear guides according to the invention that are mounted to or under the table top laterally for displacement of the table top relative to the backrest of the seat.

BACKGROUND OF THE INVENTION

Linear guides are used inter alia in furniture construction, in relation to domestic appliances, and in motor vehicle and aircraft construction, for example on adjustable seats, drawers or pull-out tables. Various linear guide systems are known from the state of the art. Very different demands are made, depending on the respective area of use. In the case of drawers for example this can involve ease of movement when pulling out the drawer and possibly a high load-bearing capacity. In addition such linear guides are also to have a long service life even when frequent movements of a drawer are involved and they are to retain their ease of movement over their service life.

Pull-out tables are frequently fitted to the backrests of the seats in transport means like train, bus or vehicle seats for use by the passenger seated therebehind. When the pull-out table is not in use it is generally folded up to the backrest and locked to prevent it from folding down. To use the pull-out table the locking arrangement is released and the pull-out table is pivoted into the horizontal, away from the seat backrest. Particularly where the spacings between rows of seats in the transport means are large for a higher level of comfort the pull-out tables are additionally moveable after having been folded down into the horizontal position away from the backrest of the seat in front towards the passenger seated therebehind to ensure that the pull-out table can be conveniently reached and used.

The demands in terms of displaceability of such pull-out tables in transport means are high in particular in regard to the more comfortable cabin classes. Displacement of the pull-out table should involve easy movement and should be reliable and should take place with a sense of touch which is pleasant for the user. Known displacement systems for pull-out tables in the less expensive segment use simple sliding guides in which the sides of the pull-out table are displaced in a simple guide groove with pull-out stops. In addition it is known to use linear guides for the displacement pull-out tables, which involve the use of ball-mounted telescopic guides to ensure a high level of comfort of movement, ease of movement and smooth displacement. However it is precisely the ease of movement of the ball-mounted telescopic guides that also represents a disadvantage in terms of use, in the specific application of pull-out tables in transport means. As space is constricted in the transport means, the transport means are in constant movement and forces act on the pull-out table due to braking and acceleration, the pull-out table, when it has very easily moveable ball-mounted linear guides, also correspondingly easily starts to move unintentionally so that articles thereon such as for example drinks are not stably supported thereon and can drop off. Therefore hitherto sliding guides which were more difficult to move have been preferably used in transport means as they remain more stably in their one position even under the effect of horizontally acting forces due to braking and acceleration of the transport means by virtue of the higher level of static friction of the sliding elements.

A great disadvantage of sliding guides, including those which use sliding elements between the oppositely displaceable rail elements, is their sensitivity in relation to an asymmetric loading in the direction of displacement of the pull-out table, that is to say if the pull-out table is not pushed in or pulled out with the same force and speed at both sides, but in an off-center fashion. When the table is pushed in off-center relationship that very frequently results in tilting of the sliding guides so that the table guide can then be displaced only with a very great deal of difficulty or not at all. That is referred to as the "slipstick" effect.

Further demands on linear guides for pull-out tables in transport means are inexpensive manufacture, ease of fitment and repair without a high level of complication and expenditure in terms of fitment, possibly latchability in predetermined displacement positions, at least in the pulled-out position, and possibly further intermediate positions, a pleasant feel sensation and guidance with a low level of noise. In addition particularly in aircraft the components should all be as low in weight as possible so that, in spite of their comfortable displacement behavior, the conventional steel telescopic rails are rarely used here.

OBJECT

Therefore the object of the present invention is to provide a linear guide which improved over the state of the art and which can be manufactured in a compact structure and of low weight and which in particular ensures reliable guidance of pull-out tables in transport means with a reduced risk of jamming due to tilting when being pushed in off-center relationship.

DESCRIPTION OF THE INVENTION

That object is attained by a linear guide having at least two rail elements which are displaceable relative to each other in the longitudinal direction, wherein each rail element has running surfaces which with running surfaces of a rail element moveable relative thereto form running tracks for receiving rolling bodies and sliding bodies between the respective two relatively displaceable rail elements, characterised in that at least one sliding body and at least two rolling bodies are provided in each running track between two rail elements, wherein at least one respective rolling body is arranged on both sides of a sliding body in the longitudinal direction of the running track.

It was surprisingly found that a linear guide with a combination of rolling bodies and sliding bodies in the arrangement according to the invention affords a considerably improved degree of certainty against jamming of the guide due to tilting with an asymmetric loading in the displacement direction. In addition the linear guide according to the invention is admittedly easy to move, but nonetheless affords an initial resistance (stick resistance) when initiating displacement of the linear guide so that an element guided thereon like for example a pull-out table does not readily start to move at low acceleration forces as occur in a transport means due to braking or acceleration. That ensures increased reliability in relation to unintended movement. In addition the linear guide according to the invention affords a feel which is pleasant for the user, it involves a low level of noise and is rattle-free both upon displacement and also in the stopped condition when external vibrations occur. It opposes an initial resistance and also a displacement resistance to movement for example of a pull-out table, which resistances however are to be overcome without difficulty, and at the same time it affords a high level of assurance against unintended displacement.

The linear guide according to the invention combines the advantages of ball-supported and sliding body-support linear guides, in which respect it is essential for the properties that are desired according to the invention that in a running track a sliding body is surrounded on both sides, that is to say at both end faces, by at least one rolling body. That ensures that the operational load upon displacement is carried by the rolling bodies and the function of the sliding body (friction element) is employed in particular when a high loading is involved.

In a particularly preferred embodiment of the linear guide according to the invention the rolling bodies are in the form of balls. Alternatively cylinders or rollers can also be envisaged as the rolling bodies for the linear guide according to the invention, but balls offer the advantage of better rolling properties. In a further preferred embodiment of the linear guide according to the invention the sliding bodies are substantially cylindrical with a cross-section which is substantially circular in the longitudinal extent of the running track. In this embodiment and if the rolling bodies are in the form of balls the rolling bodies and the sliding bodies are both of substantially the same cross-sectional shape in the direction of view along the running track.

In a further preferred embodiment the rolling bodies which are preferably in the form of balls, perpendicularly to the longitudinal extent of the running track between two running surfaces, are of a diameter which is greater than or equal to, preferably greater than the diameter of the sliding bodies. In this embodiment, with a normal loading, the rolling bodies are predominantly in contact with the two running surfaces of the oppositely displaceable rail elements and carry the operating load upon displacement of the linear guide. In the case of higher loading the outside surfaces of the sliding bodies also come into contact with the running surfaces and carry the additional load.

In a further preferred embodiment of the linear guide according to the invention the rolling bodies are made from a more elastic and/or softer material than the sliding bodies. Particularly if the diameter of the rolling bodies is greater than the diameter of the sliding bodies that embodiment is of particular advantage. With a low or normal loading the operational load is carried by the rolling bodies of somewhat larger diameter than the sliding bodies. When a higher loading is involved the more elastic and/or softer rolling bodies are slightly compressed so that the sliding bodies of somewhat smaller diameter than the rolling bodies come into contact with the running surfaces of the rail elements and thus carry a higher loading.

The rolling bodies of the linear guide according to the invention, like usual rolling bodies or balls of conventional linear guides, can be manufactured from metal, in particular steel. In a preferred embodiment of the linear guide according to the invention however the rolling bodies are produced from plastic, preferably from polytetrafluorethylene (PTFE), polyoxymethylene/polyacetate (POM) or polyamide. The sliding bodies of the linear guide according to the invention can also be made from metal, preferably brass, as brass in contact with metal running surfaces has good sliding properties. In an alternative embodiment of the linear guide according to the invention the sliding bodies are made from plastic, preferably from polytetrafluorethylene (PTFE), polyoxymethylene/polyacetate (POM) or polyamide. The above-mentioned plastic materials have the advantage that they are light in comparison with metal but nonetheless enjoy good stability and have a certain elasticity or softness for achieving the above-mentioned advantages.

It is particularly preferred according to the invention that, with the linear guide according to the invention, precisely one sliding body is arranged in each running track between two rail elements and at least one respective rolling body, preferably precisely one rolling body, quite particularly preferably precisely one ball, is arranged on both sides of the sliding body. This embodiment has the advantage of a simple structure of low weight and good displacement properties for most loading applications like for example for pull-out tables in a transport means.

In an alternative embodiment of the linear guide according to the invention which is provided in particular for higher operating loads than the above-mentioned embodiment, two or more sliding bodies are arranged in each running track between two rail elements and at least one respective rolling body, preferably precisely one rolling body, is arranged on both sides of each sliding body. That embodiment is suitable for higher loads but it requires a longer arrangement of rolling bodies and sliding bodies in the running track, whereby, in comparison with the embodiment having precisely one sliding body and two rolling bodies in a running track, the maximum displacement distance between two rail elements is shorter, with the same dimensions in respect of the sliding bodies and rolling bodies.

Desirably, in the linear guide according to the invention, provided at the rail elements are pull-out and push-in limiting means which limit the displacement travel of two rail elements relative to each other to prevent the rolling bodies and sliding bodies from moving out of the running tracks between the respective two mutually oppositely displaceable rail elements and separation of the mutually oppositely displaceable rail elements. The pull-out and push-in limiting means can be constructed in the manner known for conventional telescopic rails. In a preferred embodiment of the linear guide according to the invention the pull-out and push-in limiting means are in the form of pins projecting into the running track from the rail elements. The rail elements can be displaced by such a distance until the pins bear against the outermost rolling body in the running track. Preferably the so-called inner rail, at the end in the pull-out extension direction, has a pin which projects into the running track from the running surface and against which the rolling body that is first in the pull-out direction bears when the linear guide is extended, so that the rolling bodies and sliding bodies cannot be pushed out of the running tracks between the two oppositely displaceable rail elements. The so-called outer rail preferably has at the end in the retraction direction a pin which projects into the running track from the running surface and which upon extension of the linear guide bears against the rolling body which is last in the extension direction and thus limits the displacement travel of the rail elements in the extension direction. The outer rail further preferably has a push-in limiting means which projects into the running track from the running surface and which, upon retraction of the linear guide, bears against the rolling body which is last in the retraction direction, upon retraction of the linear guide, and thus limits the displacement travel of the rail elements in the retraction direction.

In a further preferred embodiment of the linear guide according to the invention provided at the rail elements are latching devices for releasable latching of the relatively displaceable rail elements in at least one displacement position. Latching devices can be designed in any manner as are also known for conventional telescopic rails. In a preferred embodiment the latching devices include a latching element, for example a ball, which is biased on a first rail element by means of a spring element, and on the second rail element which is displaceable relative to the first rail element at least one opening for engagement of the latching element therein. In this embodiment a spring is preferably fixed to the inside surface of a rail element, wherein the spring has a ball or another latching element fixed at its free end. The other rail element, against which the ball or the latching element on the first rail element bears upon displacement of the rail element and slides thereat, has embossings or bores into which the latching element can partially engage when the respective embossing or bore comes to lie thereover. Latching positions are fixed for the linear guide according to the invention, at which displacement of the linear guide out of those latching positions requires a higher initial force and predetermines the given positions of the item guided with the linear guide, for example a pull-out table. By way of example latching positions are desirable, with the linear guide completely extended and/or completely retracted, but also optionally in intermediate positions.

In a further preferred embodiment of the linear guide according to the invention the rail elements are made from light metal, preferably from aluminum. This embodiment is suitable in particular for applications in which the light weight of the components is an important consideration like for example in transport means, in particular in aircraft.

In an alternative preferred embodiment of the linear guide according to the invention the linear guide includes precisely two rail elements which are displaceable relative to each other in the longitudinal direction, namely an inner rail element and an outer rail element embracing the inner rail element, wherein the outer rail element is flexurally elastic and is made from bent steel sheet or bent light metal sheet and the inner rail element is preferably made from light metal, particularly preferably from aluminum.

Rail elements of light metal, for example aluminum, can be milled from the solid material or can be produced by other chip-cutting methods which are known to be suitable to the man skilled in the art and are very flexurally stiff. Preferably according to the invention the inner rail element is made from that material and in that fashion. Rail elements of light metal are of substantially lighter weight in comparison with those of steel and therefore afford considerable advantages in applications in which the light weight of the components is important.

The embodiment according to the invention, in which the outer rail element is produced from bent steel sheet or bent light metal sheet is admittedly of a somewhat greater weight due to the material involved, in comparison with embodiments in which all rail elements are made from light metal by cutting machining, but the outer rail element consisting of bent steel sheet or bent light metal sheet is substantially more flexurally elastic than a rail element produced from light metal by cutting machining. That flexural elasticity of the outer rail element imparts to the linear guide substantial advantages which, in many applications such as for example in pull-out tables in transport means, can outweigh the weight advantages of a linear guide made exclusively from light metal rail elements. The advantages of this embodiment are particularly relevant if the rolling bodies are of a diameter which is larger than the diameter of the sliding bodies. The possibility of the flexurally elastic outer rail element expanding, which is caused by the transmission of the force of the rolling bodies to the outer rail, provides that the sliding bodies which are of a smaller diameter in comparison with the rolling bodies come into engagement with the rail element. In that way loads which go beyond the usual operating loads are carried by the sliding bodies and this therefore provides an overload protection, wherein the substantial advantage is that excessively high loadings due to for example surface pressure occurring, at the contact locations of the rolling bodies, can be avoided. That effect occurs in the vertical main loading direction but also upon tilting of the guides, triggered by a for example excessively high asymmetric application of force upon displacement of the elements.

The invention also includes a pull-out table, preferably for fixing to the backrest of a seat in a transport means like a train, bus or aircraft seat, comprising a table top and two linear guides according to the present invention, that are mounted to or under the table top laterally for displacement of the table top relative to the backrest of the seat.

Further advantages, features and possible uses of the present invention will be apparent from the description hereinafter of preferred embodiments and the related Figures.

BRIEF DESCRIPTION OF THE DRAWINGS

FIG. 1 shows a side view of a linear guide according to the invention in the extended condition, FIG. 2 shows a side view of the linear guide according to the invention as shown in FIG. 1 in the retracted condition with a partly cut-away view on to rolling and sliding bodies and a partly cut-away view on to the latching device.

DETAILED DESCRIPTION

Figure 3:
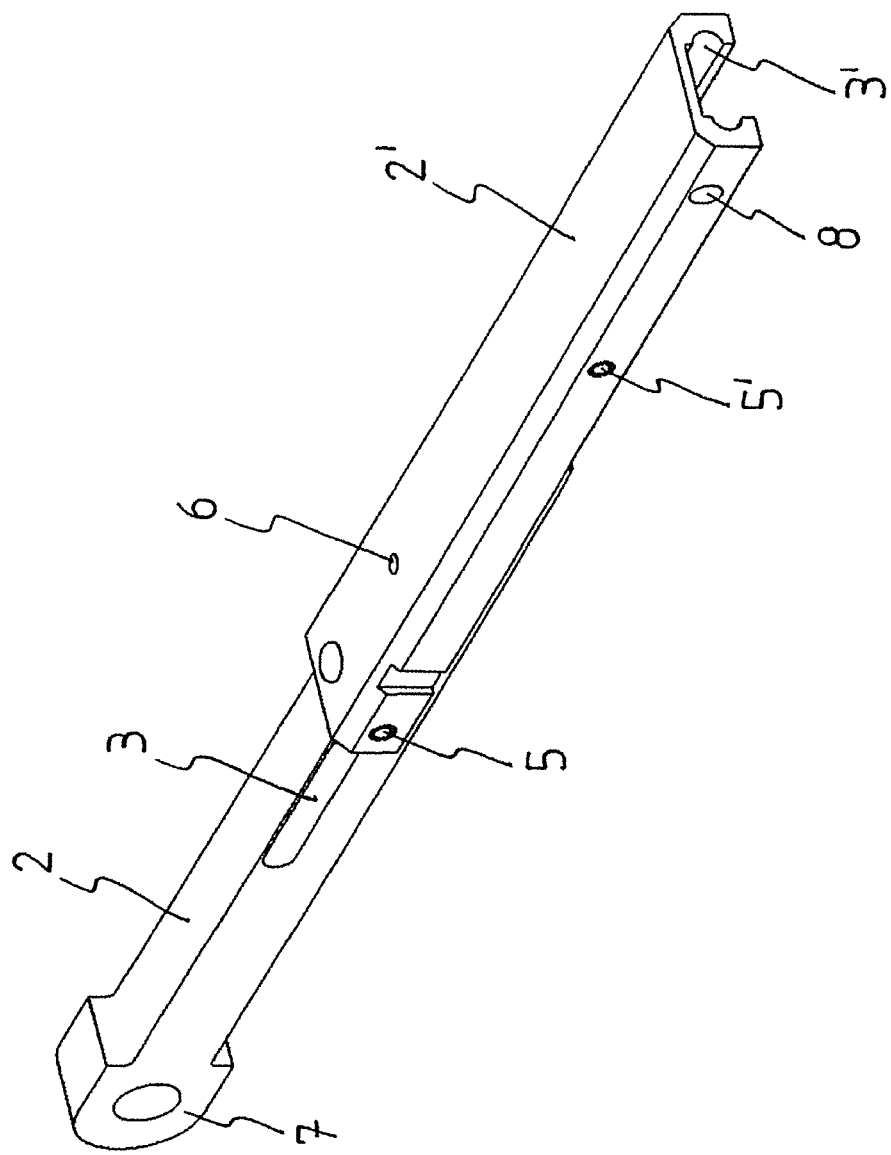
FIG. 3 shows an inclined view from above of the linear guide according to the invention as shown in FIG. 1 in the extended condition.

The linear guide according to the invention as shown in FIGS. 1 through 3 has an inner rail element 2 and an outer rail element 2' displaceable relative thereto in the longitudinal direction. The inner rail element 2, on both sides of the rail element, has a respective running surface 3 which, with further running surfaces 3' arranged on the inside of the outer rail 2', forms two mutually opposite running tracks 4 for receiving rolling bodies 10 and sliding bodies 11. In this embodiment of the linear guide according to the invention arranged in each running track 4 are two rolling bodies 10 in the form of balls and a substantially cylindrical sliding body 11 of a cross-section which is substantially circular in the longitudinal extent of the running track 4. Precisely one rolling body 10 is arranged on each of the two sides of the sliding body 11 in the longitudinal direction of the running track 4. The partly cut-away view in FIG. 2 shows a view on to the rolling and sliding bodies 10 and 11 in the running track 4.

Provided at the rail elements 2 and 2' are pull-out and push-in limiting means 5, 5' and 5" which are in the form of pins projecting from the respective running surfaces 3 and 3' of the rail elements 2 and 2' into the running track 4. The outer rail 2' has a pull-out limiting means 5 and a push-in limiting means 5', the position of which can be seen for example in the side view in FIG. 1 as the limiting means 5 and 5' are fitted or screwed in through openings in the side wall of the outer rail element. The pull-out limiting means 5" on the inner rail 2 can be seen in FIG. 2 through a mounting opening 8 in the side wall of the outer rail 2'. The pull-out limiting means 5" is fixed to the running surface 3 of the inner rail 2 through the mounting opening 8 after the rail elements 2 and 2' have been assembled together with the rolling and sliding bodies 10 and 11. The pull-out and push-in limiting means 5, 5' and 5" limit the displacement travel of the rail elements 2 and 2' relative to each other and prevent the rolling bodies 10 and sliding bodies 11 from moving out of the running tracks 4.

The further partly cut-away view in FIG. 2 shows a view on to a latching device 6, 6', 6" for releasably latching the rail elements 2 and 2' which are displaceable relative to each other, in at least one displacement position. In this embodiment the latching device comprises an opening 6 in the form of a through bore in the rear wall of the outer rail element 2' and a latching element 6' which here is in the form of a ball and which is biased by means of a spring element 6" which is fixed to the inner rail element 2 and supported thereon, in the direction of the rear wall of the outer rail element 2'. When the ball 6' which is biased by the spring element 6" comes to lie above the opening 6 upon displacement of the rail elements 2 and 2' it comes into engagement with the opening 6 so that, depending on the respective force of the spring element 6", the linear guide is secured more or less firmly against displacement out of that position. For further displacement of the rail elements 2 and 2' out of that latching position, a greater initial force is to be applied for disengaging the latching element 6' and the opening 6, than for displacement out of a position other than the latching position. Outside the latching positions the fact of the latching element 6' being pressed against the rear wall of the rail element 2' by the force of the spring element 6" provides that there is a basic resistance in regard to displacement of the rail elements 2 and 2', whereby a pleasant feel is afforded to the user and excessively easy displacement of the rail elements 2 and 2' is avoided.

The embodiment of the linear guide according to the invention, as shown in FIG. 1 through 3, further has a hinge element 7 at the end of the inner rail element 2, which is suitable for example for fixing the linear guide 1 to the backrest of a seat in a transport means like a bus seat, train seat or aircraft seat. For example the table top of a pull-out table can be mounted to a pair of linear guides fixed in that way. Depending on the respective application involved however the linear guide according to the invention can also be embodied without the hinge 7, with or without an alternative fixing device.

Figure 4:
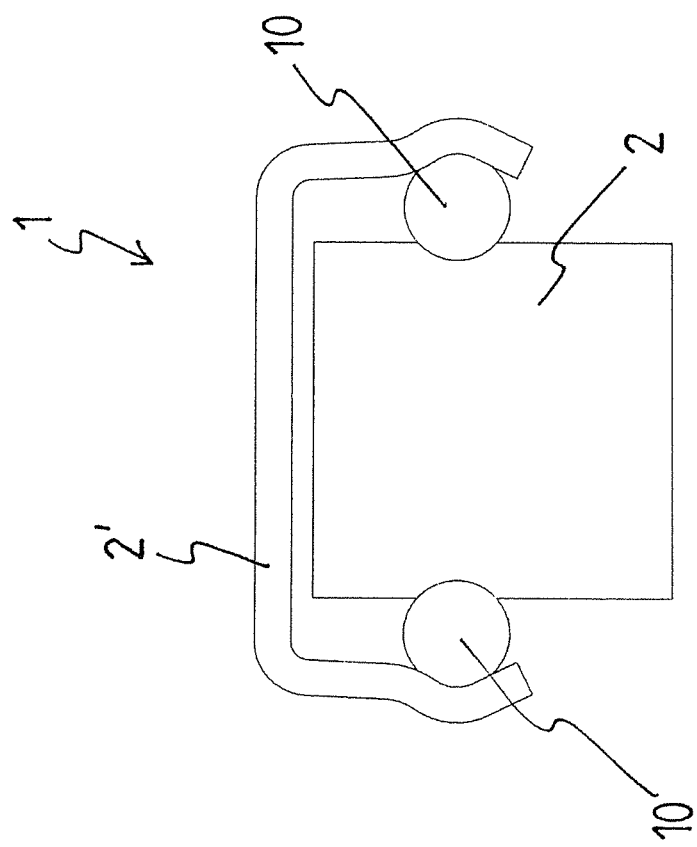
FIG. 4 is a diagrammatic view showing a preferred alternative embodiment of a linear guide according to the invention in a cross-section through the rail elements and a pair of balls with an inner rail element of light metal and an outer rail element which embraces the inner rail element and which is flexurally elastic and produced from bent steel sheet.
Figure 5:
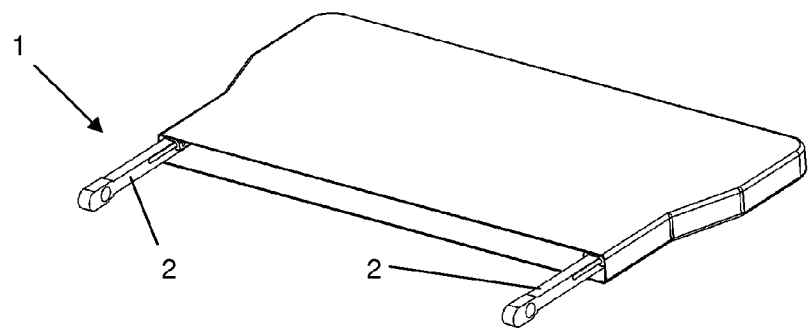
FIG. 5 is a top perspective view of a pull-out table according to the present invention.
Figure 6:
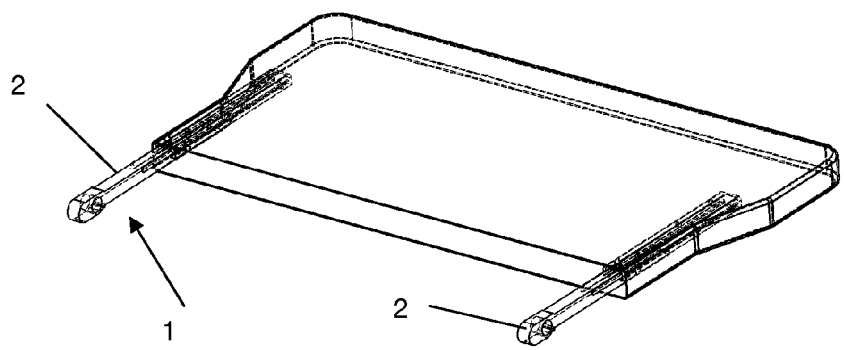
FIG. 6 is a bottom perspective view of the pull-out table of FIG. 9.
Figure 7:
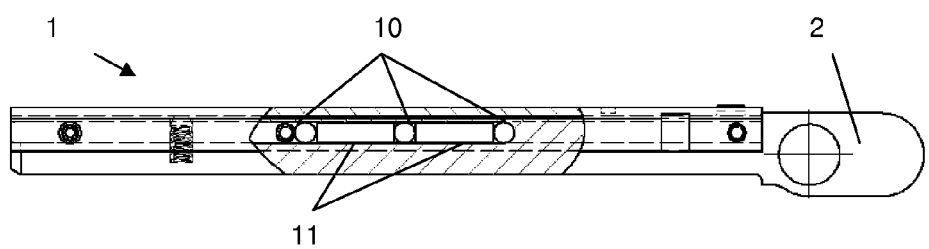
FIG. 7 is a side elevation view of a second embodiment of a linear guide of the present invention having two sliding bodies and shown in an extended configuration.
Figure 8:
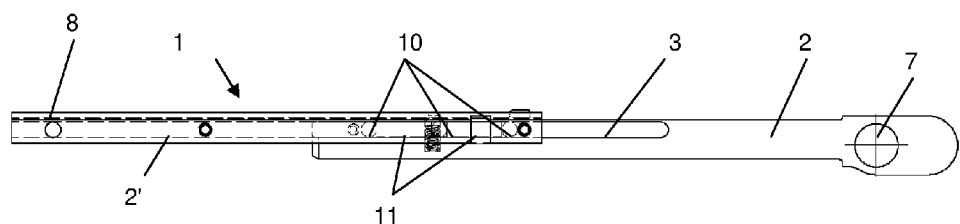
FIG. 8 is a side elevational view of the linear guide of FIG. 7 shown in a contracted configuration.
Figure 9:
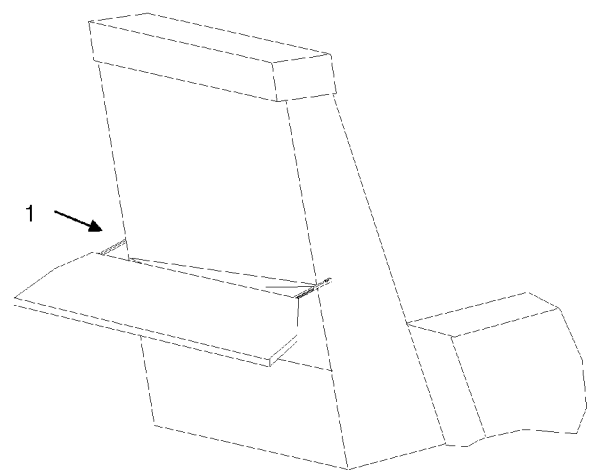
FIG. 9 is a perspective view of a pull-out table of the present invention shown fixed to the backrest of a seat in a transport means like a train, bus or aircraft seat.

The alternative embodiment of a linear guide according to the invention, as shown in FIG. 4, includes two rail elements 2 and 2', wherein the inner rail element 2, as in the case of the linear guides of FIGS. 1 through 3, comprises light metal, more specifically here aluminum, but the outer rail element 2' which embraces the inner rail element 2 is flexurally elastic and is produced from bent steel sheet, with a profile which is substantially C-shaped in cross-section. The flexural elasticity affords the advantages described hereinbefore.

LIST OF REFERENCES 1 linear guide
2, 2' rail elements
3, 3' running surfaces
4 running tracks
5, 5', 5" pull-out and push-in limiting means
6, 6', 6" latching devices
7 hinge element
8 mounting opening
10 rolling bodies
11 sliding bodies

The invention claimed is:

1. A linear guide (1) having at least two rail elements (2, 2') which are displaceable relative to each other in the longitudinal direction, wherein each rail element (2, 2') has running surfaces (3, 3') which with running surface (3, 3') of a rail element (2, 2') moveable relative thereto form running tracks (4) for receiving rolling bodies (10) and sliding bodies (11) between the respective two relatively displaceable rail elements, characterised in that at least one sliding body (11) and at least two rolling bodies (10) are provided in each running track (4) between the two rail elements (2, 2'), wherein on each side of the sliding body (11) there is arranged at least one of the rolling bodies (10) in the longitudinal direction of the running track (4), wherein the rolling bodies (10) are in the form of balls and that the sliding bodies (11) are substantially cylindrical with a cross-section which is substantially circular in the longitudinal extent of the running tracks (4).

2. A linear guide as set forth in claim 1, wherein characterised in that the rolling bodies (10) are made from 20 polytetrafluorethylene (PTFE), polyoxymethylene/polyacetate (POM) or polyamide, and/or that the sliding bodies (11) are made from metal, preferably brass, or from plastic, preferably polytetrafluorethylene (PTFE), polyoxymethylene/polyacetate (POM) or polyamide.

3. A pull-out table, for fixing to the backrest of a seat in a transport means, comprising a table top and two linear guides as set forth in claim 2, that are mounted to or under the table top laterally for displacement of the table top relative to the backrest of the seat.

4. A linear guide as set forth in claim 1, wherein characterised in that the rolling bodies (10) are made from a more elastic and/or softer material than the sliding bodies (11).

5. A pull-out table, for fixing to the backrest of a seat in a transport means, comprising a table top and two linear guides as set forth in claim 4, that are mounted to or under the table top laterally for displacement of the table top relative to the backrest of the seat.

6. A linear guide as set forth in claim 1, wherein perpendicularly to the longitudinal extent of the running track (4) between two running surfaces (3, 3') the rolling bodies (10) are of a diameter which is greater than or equal to the diameter of the sliding bodies (11).

7. A pull-out table, for fixing to the backrest of a seat in a transport means, comprising a table top and two linear guides as set forth in claim 6, that are mounted to or under the table top laterally for displacement of the table top relative to the backrest of the seat.

8. A linear guide as set forth in claim 1, wherein precisely one sliding body (11) is arranged in each running track (4) between two rail elements (2, 2') precisely one rolling body (10), is arranged on each side of the sliding body (11).

9. A pull-out table, for fixing to the backrest of a seat in a transport means, comprising a table top and two linear guides as set forth in claim 8, that are mounted to or under the table top laterally for displacement of the table top relative to the backrest of the seat.

10. A linear guide as set forth in claim 1, wherein two or more sliding bodies (11) are arranged in each running track (4) between two rail elements (2, 2') and at least one respective rolling body (10), is arranged on each side s of each sliding body (11).

11. A pull-out table, for fixing to the backrest of a seat in a transport means, comprising a table top and two linear guides as set forth in claim 10, that are mounted to or under the table top laterally for displacement of the table top relative to the backrest of the seat.

12. A linear guide as set forth in claim 1, wherein provided at the rail elements (2, 2') are pull-out and push-in limiting means (5, 5', 5") which limit the displacement travel of two rail elements (2, 2') relative to each other to prevent the rolling bodies (10) and sliding bodies (11) from moving out of the running tracks (4) between the respective two relatively displaceable rail elements (2, 2') and separation of the relatively displaceable rail elements.

13. A pull-out table, for fixing to the backrest of a seat in a transport means, comprising a table top and two linear guides as set forth in claim 12, that are mounted to or under the table top laterally for displacement of the table top relative to the backrest of the seat.

14. A linear guide as set forth in claim 1, wherein provided at the rail elements (2, 2') are latching devices (6, 6', 6") for releasable latching of the relatively displaceable rail elements (2, 2') in at least one displacement position, wherein the latching devices (6, 6', 6") include a latching element (6'), which is biased on one of the rail elements (2') by means of a spring element (6"), and on the other rail element (2) at least one opening (6) for engagement of the latching element therein.

15. A pull-out table, for fixing to the backrest of a seat in a transport means, comprising a table top and two linear guides as set forth in claim 14, that are mounted to or under the table top laterally for displacement of the table top relative to the backrest of the seat.

16. A linear guide as set forth in claim 1, wherein the rail elements (2, 2') are made from light metal.

17. A linear guide as set forth in claim 1, wherein the linear guide (1) includes precisely two rail elements (2, 2') which are displaceable relative to each other in the longitudinal direction, namely an inner rail element (2) and an outer rail element (2') embracing the inner rail element (2), wherein the outer rail element (2') is flexurally elastic and is made from bent steel sheet or bent light metal sheet and the inner rail element (2) is made from light metal.

18. A pull-out table, for fixing to a backrest of a seat in a transport means, comprising a table top and two linear guides as set forth in claim 1, that are mounted to or under the table top laterally for displacement of the table top relative to the backrest of the seat.

* * * * *